(12) United States Patent
Zhang et al.

(10) Patent No.: US 10,581,537 B2
(45) Date of Patent: Mar. 3, 2020

(54) DEVICES AND METHODS FOR ROBUST MEASUREMENT AND DATA RECEIVING

(71) Applicant: Intel IP Corporation, Santa Clara, CA (US)

(72) Inventors: Yushu Zhang, Beijing (CN); Yuan Zhu, Beijing (CN); Gang Xiong, Beaverton, OR (US); Huaning Niu, Milpitas, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/770,948

(22) PCT Filed: Mar. 9, 2016

(86) PCT No.: PCT/US2016/021440
§ 371 (c)(1),
(2) Date: Apr. 25, 2018

(87) PCT Pub. No.: WO2017/074488
PCT Pub. Date: May 4, 2017

(65) Prior Publication Data
US 2018/0309526 A1    Oct. 25, 2018

(30) Foreign Application Priority Data

Oct. 27, 2015  (WO) ............... PCT/CN2015/092921

(51) Int. Cl.
*H04B 17/327* (2015.01)
*H04B 7/06* (2006.01)
*H04L 5/00* (2006.01)

(52) U.S. Cl.
CPC ......... *H04B 17/327* (2015.01); *H04B 7/0617* (2013.01); *H04L 5/0023* (2013.01); *H04L 5/0048* (2013.01)

(58) Field of Classification Search
CPC ... H04B 17/327; H04B 7/0617; H04L 5/0023; H04L 5/0048; H04L 5/0091
See application file for complete search history.

(56) References Cited

U.S. PATENT DOCUMENTS

| 2012/0076039 | A1* | 3/2012 | Kwon | ............... H04B 7/026 370/252 |
| 2012/0122392 | A1* | 5/2012 | Morioka | ............ H04B 7/0695 455/25 |

(Continued)

FOREIGN PATENT DOCUMENTS

| WO | WO-2014157867 A1 | 10/2014 |
| WO | WO-2015147717 A1 | 10/2015 |

OTHER PUBLICATIONS

"3GPP; TSGRAN; Study on elevation beamforming/Full-Dimension (FD) Multiple Input Multiple Output (MIMO) for LTE", 3GPP TR 36.897 v13.0.0, (Jul. 3, 2015).

(Continued)

*Primary Examiner* — Janice N Tieu
(74) *Attorney, Agent, or Firm* — Kowert, Hood, Munyon, Rankin & Goetzel, P.C.

(57) ABSTRACT

Devices and methods of simultaneous data reception and measurement are generally described. A UE transmits to an eNB antenna capacity and receives a Beamformed Reference Signal (BRS) configuration in response. Beamformed signals from the eNB include a BRS subframe in accordance with the BRS configuration. The BRS subframe has a BRS whose structure depends on the UE antenna capacity. If the UE has a single antenna panels, neither an EPDCCH nor a PDSCH for the UE is in the BRS frame. If the UE has a single antenna panels and multiple ports or multiple antenna panels, the BRS may contain an EPDCCH or PDSCH for the UE as different ports or antenna panels may be assigned different functionality. The UE measures BRS Received (Continued)

Power (BRS-RP) of the BRS, transmits a BRS report based on the BRS-RP and selects an optimal beam based on BRS-RPs from BRSs of the beams.

24 Claims, 6 Drawing Sheets

(56) References Cited

U.S. PATENT DOCUMENTS

| | | | | |
|---|---|---|---|---|
| 2012/0329498 A1* | 12/2012 | Koo | ............ | H04J 11/005 |
| | | | | 455/501 |
| 2013/0059619 A1* | 3/2013 | Kim | ............ | H04W 72/046 |
| | | | | 455/509 |
| 2014/0153471 A1* | 6/2014 | Zhang | ............ | H04W 4/06 |
| | | | | 370/312 |
| 2017/0034812 A1* | 2/2017 | Deng | ............ | H04W 72/046 |
| 2018/0146389 A1* | 5/2018 | Nagata | ............ | H04W 16/28 |

OTHER PUBLICATIONS

"Discussion on the feedback framework for beamformed CSI-RS", CATT, R1-154226, 3GPP TSG RAN WG1 Meeting #82, Beijing, China.

"International Application Serial PCT/US2016/021440, International Search Report dated Jul. 26, 2016", 3 pgs.

"International Application Serial No. PCT/US2016/021440, Written Opinion dated Jul. 26, 2016", 11 pgs.

"On remaining details of beam selection indicator (BI) for CSI class B", CATT, R1-155214, 3GPP TSG RAN WG1 Meeting #82bis, Malmo, Sweden, (Sep. 25, 2015).

\* cited by examiner

DEVICES AND METHODS FOR ROBUST MEASUREMENT AND DATA RECEIVING

PRIORITY CLAIM

This application is a U.S. National Stage Filing under 35 U.S.C. 371 from International Application No. PCT/US2016/021440, filed Mar. 9, 2016 and published in English as WO 2017/074488 on May 4, 2017, which is a continuation of and claims priority under 35 U.S.C. § 120 to International Application No. PCT/CN2015/092921, filed Oct. 27, 2015, and entitled "ROBUST MEASUREMENT AND DATA RECEIVING," each of which is incorporated herein by reference in its entirety.

TECHNICAL FIELD

Embodiments pertain to Multiple Input Multiple Output (MIMO) communication in cellular networks. Some embodiments relate to initial access in MIMO communication in cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

With the ever-increasing demand for bandwidth, network operators have turned to Multiple Input Multiple Output (MIMO) systems to increase the amount of data simultaneously delivered. MIMO systems use multipath signal propagation to communicate with one or more user equipments (UEs) via multiple signals transmitted by the same evolved NodeB (eNB) on the same or overlapping frequencies that would interfere with each other if they were on the same path. This increase in uplink or downlink data may be dedicated to one UE, increasing the effective bandwidth for that UE by the number of spatial streams (Single User MIMO or SU-MIMO) or may be spread across multiple UEs using different spatial streams for each UE (Multiple User MIMO or MU-MIMO). MU-MIMO systems may use beamforming, in which multiple signals may be transmitted in parallel in different directions. MU-MIMO systems, however, may complicate a variety of transmission and reception matters. For example, the use of multiple beams may engender issues with simultaneous measurement and data receiving in a UE that uses receive beamforming.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
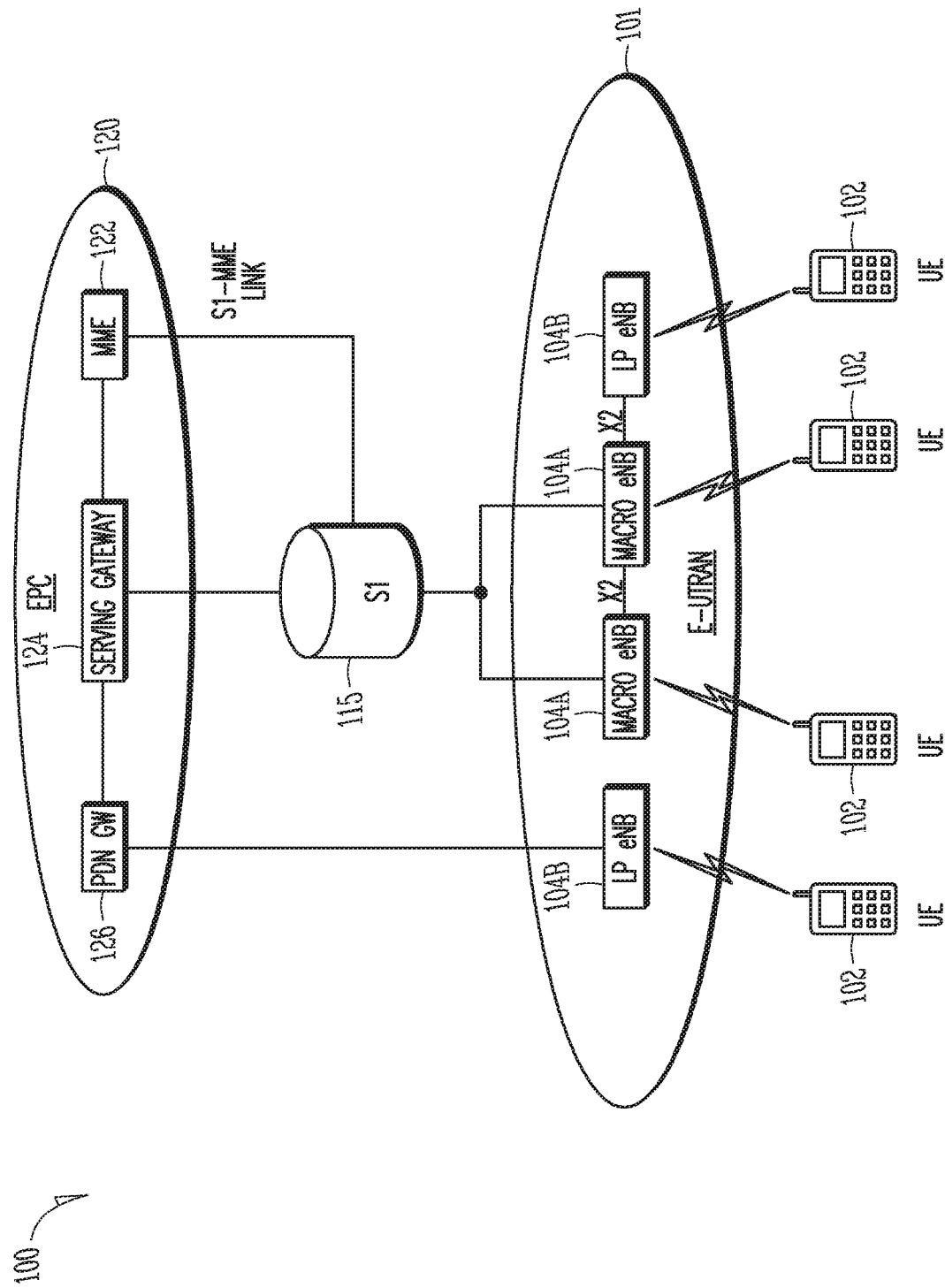
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed, including 4G and 5G networks. The network 100 may comprise a radio access network (RAN) (e.g., as depicted, the evolved universal terrestrial radio access network (E-UTRAN) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment UE 102. The eNBs 104 may include macro eNBs 104*a* and low power (LP) eNBs 104*b*. The eNBs 104 and UEs 102 may employ the synchronization techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 may serve as the local mobility anchor for data bearers when a UE 102 moves between eNBs 104. The serving GW 124 may retain information about the bearers when the UE 102 is in idle state (known as ECM_IDLE) and temporarily buffer downlink data while the MME 122 initiates paging of the UE 102 to re-establish the bearers.

The serving GW 124 and the MME 122 may be implemented in one physical node or separate physical nodes. The MME 122 may be connected with a Home Subscriber Server (HSS) 128 that contains user-related and subscription-related information. The HSS 128 may support mobility management, call and session establishment support, user authentication and access authorization. The protocols running between the UE 102 and the EPC 124 are known as the Non-Access Stratum (NAS) protocol. Other protocols, including RRC. Packet Data Convergence Protocol (PDCP), Radio Layer Control (RLC), Media Access Control (MAC)

and Physical Layer (PHY), are terminated in the eNB 104. The NAS layer performs EPS bearer management, authentication for LTE, mobility support for idle mode UEs, paging origination for idle mode UEs, and security handling.

The RRC layer may provide radio resource management, RRC connection management, and mobility support for connected mode UEs 102. As the RRC control message between the eNB 104 and the UE 102, the RRC layer may handle the broadcast of system information, which is cell-specific, and a dedicated RRC control message, which is UE-specific. In addition, the RRC layer may perform paging, radio bearer control, and control of UE measurement reporting, among others. The PDCP layer may process RRC messages in the control plane and IP packets in the user plane. Depending on the radio bearer, the PDCP layer may perform header compression, security (integrity protection and ciphering), and support for reordering and retransmission during handover. There may be one PDCP entity per radio bearer. The RLC layer may provide segmentation and reassembly of upper layer packets to adapt the packets to a size that can actually be transmitted over the radio interface. For a radio bearer using error-free transmission, the RLC layer may also perform retransmission to recover from packet losses. Additionally, the RLC layer may perform reordering to compensate for out-of-order reception due to HARQ (Hybrid Automatic Repeat reQuest) operation in the layer below. There may be one RLC entity per radio bearer. The MAC layer may multiplex the data from different radio bearers. By deciding the amount of data that can be transmitted from each radio bearer and instructing the RLC layer as to the size of packets to provide, the MAC layer aims to achieve the negotiated QoS (Quality of Service) for each radio bearer. For the uplink, this process may include reporting to the eNB 104 the amount of buffered data for transmission. The PHY layer may perform CRC insertion, channel coding, physical channel HARQ processing, channel interleaving, scrambling, modulation, layer mapping and pre-coding for transport channels. Power control and cell search procedures are also performed as the PHY functions.

The PDN GW 126 may terminate a SGi interface toward the packet data network (PDN). The PDN GW 126 may route data packets between the EPC 120 and the external PDN, and may perform policy enforcement and charging data collection. The PDN GW 126 may be responsible for IP address allocation for the UEs 102, as well as QoS enforcement and flow-based charging according to the rules from the PCRF (Policy and Charging Rules Functions). The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120, It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104*b* may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104*b* might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104*a* via an X2 interface. Picocell eNBs or other LP eNBs LP eNB 104*b* may incorporate some or all functionality of a macro eNB LP eNB 104*a*. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. The eNB may schedule transmissions over a variety of frequency bands. The allocation of resources in subframes used in one frequency band and may differ from those in another frequency band. Each slot of the subframe may contain 6-7 OFDM symbols, depending on the system used. In some embodiments, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each downlink subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

In addition to the PDCCH, an enhanced PDCCH (EPDCCH) may be used by the eNB and UE. Unlike the PDCCH, the EPDCCH may be disposed in the resource blocks normally allocated for the PDSCH. Different UEs may have different EPDCCH configurations that are configured via Radio Resource Control (RRC) signaling. Each UE may be configured with sets of EPDCCHs, and the configuration can also be different between the sets. Each EPDCCH set may have 2, 4, or 8 PRB pairs. In some embodiments, resource blocks configured for EPDCCHs in a particular subframe may be used for PDSCH transmission if the resource blocks are not used for the EPDCCH transmissions during the subframe.

Similarly, different physical uplink channels may include the Physical Uplink Control Channel (PUCCH) used by the UE to send Uplink Control Information (UCI) to the eNB and request a Physical Uplink Shared Channel (PUSCH) used to provide uplink data to the eNB. The PUCCH may be mapped to an UL control channel resource defined by an orthogonal cover code and two resource blocks, consecutive in time, with hopping potentially at the boundary between adjacent slots. The PUCCH may take several different formats, with the UCI containing information dependent on the format. Specifically, the PUCCH may contain a scheduling request (SR) that may permit the UE to request uplink resources for the PUSCH, acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

Figure 2:
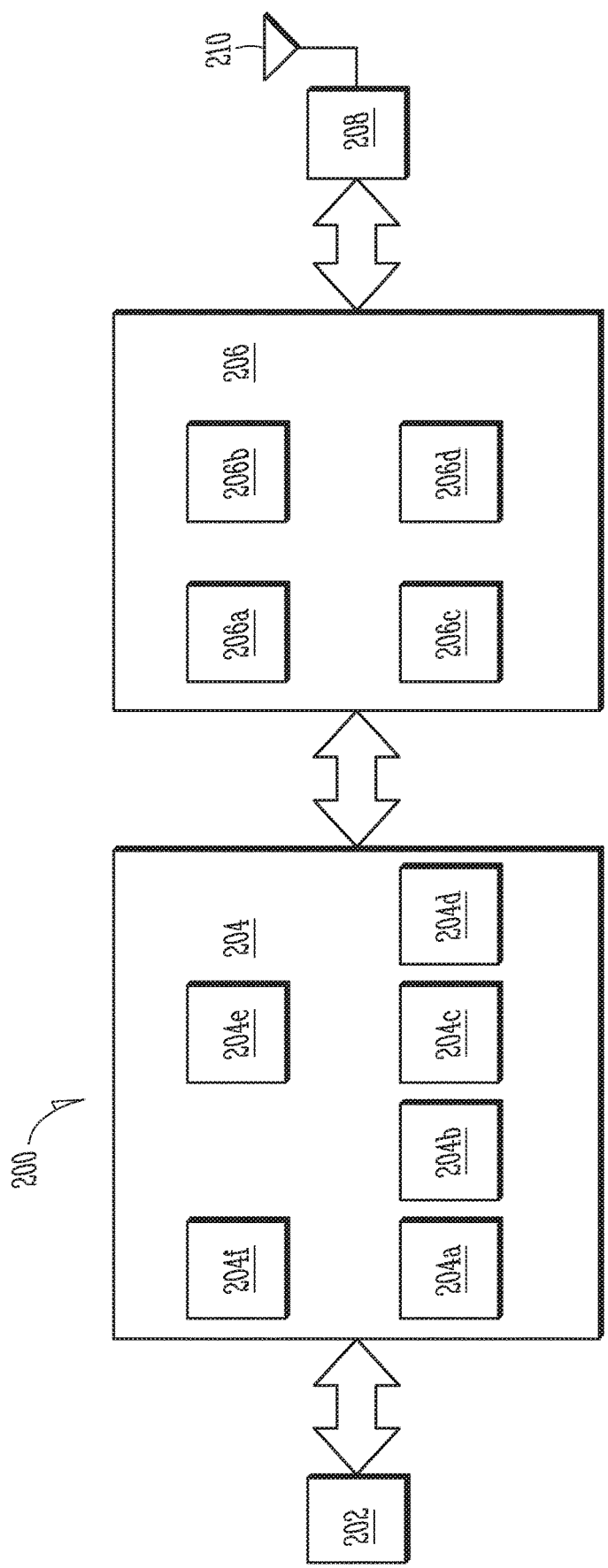
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (E-UTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (MAN), or other 2G, 3G, 4G, 5G, etc. technologies either already developed or to be developed.

RF circuitry 206 may enable communication with wireless networks using modulated electromagnetic radiation through a non-solid medium. In various embodiments, the RE circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In sonic embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
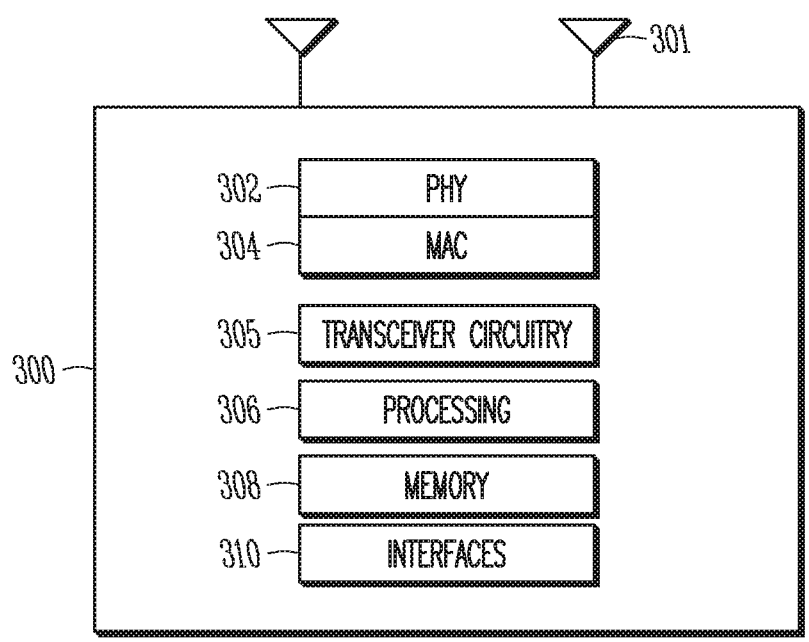
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies and, for example, may contain an LTE stack. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
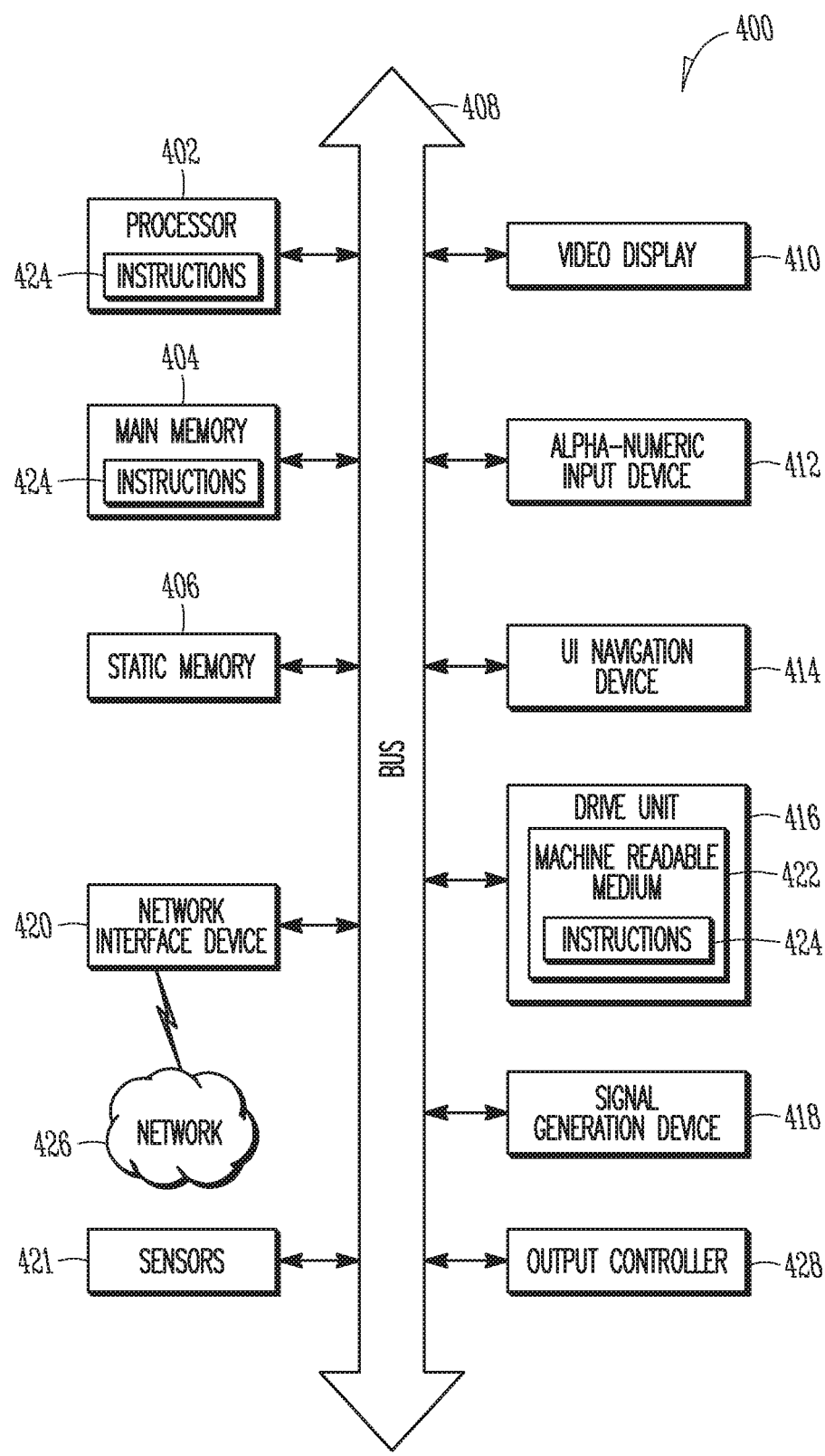
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As shown in FIGS. 1-4, various types of reference signals may be transmitted by an eNB for a UE to measure. The different reference signals may include, for example, cell-specific reference signals (CRS) used for cell search and initial acquisition, demodulation and channel quality estimation and UE-specific reference signals (DMRS) for PDSCH demodulation by the UE, as well as for handover. The number and type of downlink reference signals has increased with newer generations of LTE networks. This has led to issues regarding placement of the reference signals as well as with balance of the reference signal load with data transmission. Such issues have moreover become complicated with the advent of MIMO systems, in which the same reference signals may be transmitted on different beams from the same eNB but using different resource blocks. In particular, the introduction of massive MIMO systems have only added to reference signal issues to an even greater extent due to the increased number of antennas, antenna panels and antenna ports. Massive MIMO systems may contain at present multiple antenna panels, each of which may contain 64-128 antennas. As 5G and further systems become more advanced. In various MIMO systems, the eNB and/or UE may employ beamforming to increase data throughput or quality. Different reference signals may be transmitted by the eNB in each beam for power measurement by the UEs serviced by the eNB and beam selection. These reference signals (referred to as Beamformed Reference Signals (BRSs)) may be located in different symbols within a subframe, with at least some of the remaining resource blocks in the subframe used for transmitting data. Because of the disparity between the BRS allocations in the different transmit beamformed signals, however, UEs that use receive beamforming may be unable to simultaneously measure the beamforming power and receive downlink data.

Specifically, it may be desirable for a UE to measure the power of a beamformed reference signal (BRS) (BRS received power or BRS-RP). In MIMO systems, the eNB may transmit different beamformed reference signals in the PDSCH on the different antennas. In particular, the different beamformed reference signal may use different sequences to enable the UE to distinguish between the various beamformed reference signals. The sequences may be similar to those used for Secondary Synchronization Signal (SSS) sequences, which may be an interleaved concatenation of two length-31 binary sequences scrambled with a scrambling sequence given by the Primary Synchronization Signal (PSS). In some embodiments, the BRS transmitted from each eNB antenna port may be a cyclic shift of a base sequence. In some embodiments, the UE may perform a scan to determine which BRS to measure the BRS-RP and subsequently transmit BRS-RP information as well as identity information of the beam and UE. This information, for example, may enable the eNB to determine the best direction for transmitting data to the UE.

As above, in massive MIMO systems (either MU-MIMO or SU-MIMO systems) in addition to each beam using a different BRS sequence, the eNB may allocate different resource blocks in the PDSCH for transmission of the different BRS. The eNB may thus transmit data and BRS in the PDSCH to the same UE; the location of the BRS may, however, vary within the subframe with the allocated resource block. This may cause an issue in circumstances in which the UE also has multiple antenna panels and uses receiving beamforming, in which the UE receives multiple beams, as the UE may not be able to use the different beams to simultaneously measure the BRS-RP and receive the data from the eNB.

To this end, the eNB may adjust transmission of the BRS within the beams dependent on the recipient (UE) antenna capabilities, such as the number of antenna panels of the recipient. However, to accomplish this, it may be desirable for the eNB to obtain information regarding the UE antenna capabilities, and thus MIMO capabilities. In some embodiments, the UE may provide the UE antenna information during initial attachment to the eNB, such as in an Attach Request, or during handover in a Tracking Area Update message. Alternatively, once the UE is registered with the eNB, the eNB may transmit a dedicated message in the PDCCH or PDSCH to the UE requesting the UE antenna information. In some embodiments, the eNB may obtain the UE antenna information from the MME or from the home network of the UE (such as via a Home Subscriber Server (HSS)) or other network-based server storing UE characteristics. For example, the eNB may only request the antenna information after determining to but prior to providing MIMO signals to the UE.

The UE antenna information may include whether the UE has a single antenna panel (i.e., only one antenna panel) or multiple antenna panels for serving eNB reception. The UE antenna information may specifically include the number of antenna panels. The UE antenna information may further include parameters for each antenna panel such as whether the UE antenna panel supports receiver beamforming, the number of digital chains per antenna panel, and the number of receiver and transmitter antenna ports. Thus, in some embodiments, the number of antenna panels and the number of digital streams each antenna panel is capable of receiving, as well as which of the UE antenna panels (if any) supports receiver beamforming, may be included in a UE capability enquiry message containing the UE antenna information. A UE capability enquiry message containing the UE antenna information may be transmitted by UE initiation or in response to an external event, such as a request from the eNB or the UE being handed over from one eNB to another.

Figure 5:
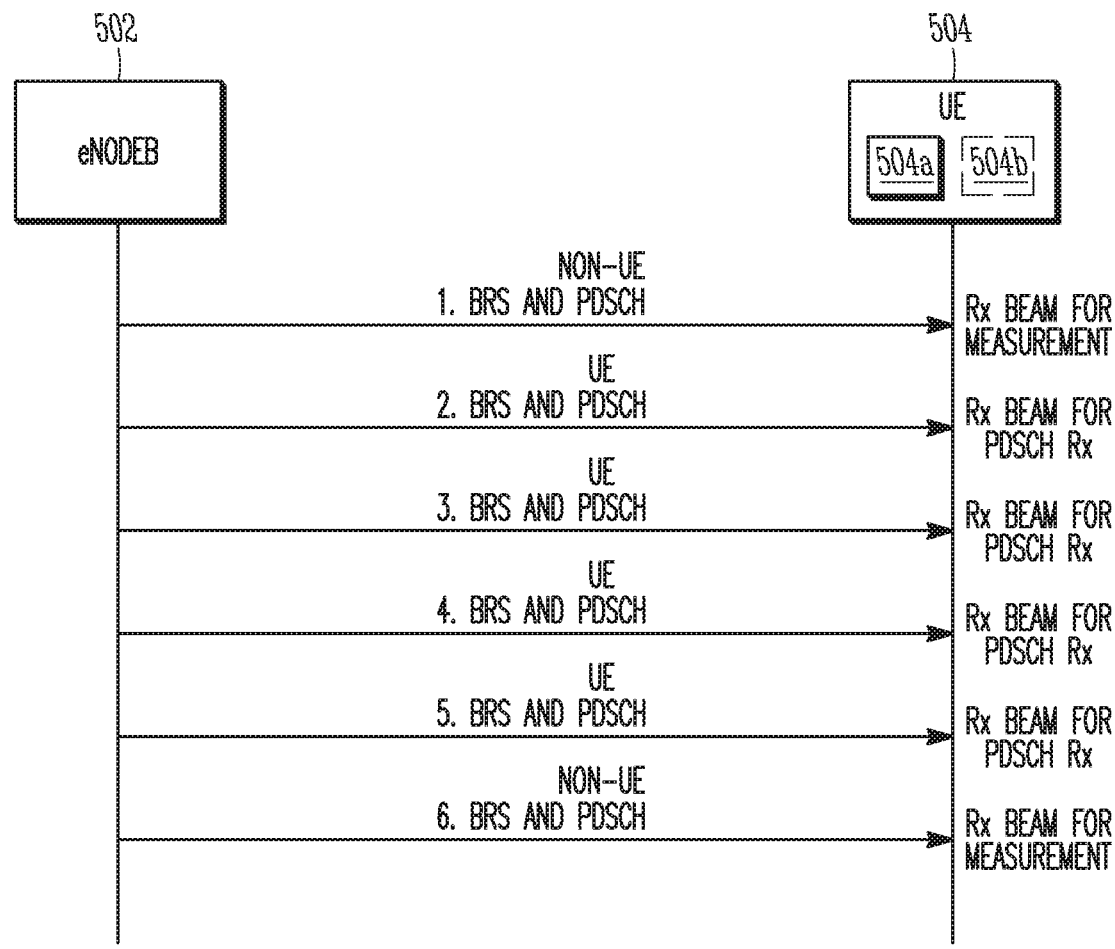
FIG. 5 illustrates communications between an eNB and UE in accordance with some embodiments.

After the UE antenna information is received by the eNB, the eNB may communicate with the UE using MIMO. FIG. 5 illustrates communications between an eNB and UE in accordance with some embodiments. In FIG. 5, the UE 504 may have a single antenna panel 504a for reception of communications from the eNB 502. In other embodiments, described below, the UE 504 may have a multiple antenna panels 504a, 504b. The eNB 502 may transmit different BRS in different resource blocks in different beams. In this case, the UE 504 may be unable to determine the best receiver beam from the eNB 502. The UE 504 may be unable to simultaneously measure and track the BRS and decode the EPDCCH/PDSCH, all of which are contained in one subframe. To circumvent this, rather than using each BRS opportunity, in some embodiments the eNB 502 may transmit and/or the UE 504 may periodically perform BRS measurements. As indicated below, the structure of either or both the BRS subframe (e.g., what else is in the subframe) and structure of the beams (e.g., which beams carry information for the UE 504) may be dependent on antenna information of the UE 504.

In some embodiments, the BRS measurement may be enabled for reception by the UE 504 every K BRS subframes or frames, with a subframe or frame offset $K_{offset}$. The period K may be a non-zero integer value, such as an integer value that is greater than 1, with $K_{offset}$ taking a value from 0 to K-1. The period K and subframe offset $K_{offset}$ may be configured by dedicated RRC signaling from the eNB 502 to the UE 504. In some embodiments, in which multiple UEs 504 are served by the eNB 502, the period K and subframe offset $K_{offset}$ may be configured individually for each UE 504 so that one or both the values may change for each UE 504. In the example shown in FIG. 5, K=5 and $K_{offset}$=0, thus subframe 1 and subframe 6 contain the BRS (BRS subframes) and for which the UE is configured to measure the BRS-RP, with the remaining subframes carrying a PDSCH for the UE. In some embodiments, the beam of which the BRS is measured may change each time the UE measures the BRS. In some embodiments, the beam of which the BRS is measured by the UE may change after multiple measurements of the BRS of the same beam. In some embodiments, the BRS may be allocated to the same resource blocks among the beams (and thus subframes); in other embodiments, the resource blocks on which the BRS is located may vary with the beam or subframe. To perform a single beam searching (i.e., measure BRS of all of the beams a single time) to select the optimal beam, may thus take M BRS subframes, where M is K×the number of beams. The BRS-RP measurement may then occur in the BRS subframes:

$$0 \leq (n_{sf} \mod T_{BRS}) \mod K - K_{offset} < M$$

where $n_{sf}$ indicates the subframe number (SFN), $T_{BRS}$ represents the BRS subframe period (e.g., $T_{BRS}$=25) and M may be configured by RRC signaling. For a BRS subframe when the BRS measurement is not enabled, the UE 504 and the eNB 502 may consider the BRS subframe as a normal downlink data subframe (i.e., without the BRS), also referred to as a PDSCH subframe. Unlike the BRS subframes, which the eNB 502 does not schedule (and thus do not contain) either an EPDDCH or PDSCH for the UE 502, the PDSCH subframes may contain PDSCH for the UE 504. The PDSCH subframes are denoted by the subframes 2-5 in FIG. 5. In other embodiments, select the optimal beam multiple BRS-RP measurements of the same beam may be taken, for example, consecutively or separated by M BRS subframes.

After measurement and determination of the BRS-RP for each beam, the optimal beam may be selected by the UE 504 for EPDCCH and PDSCH decoding. For BRS subframes (as above, subframes 1 and 6 in FIG. 5), the eNB 502 may not schedule any uplink grant or downlink data for the UE 504 and the UE 504 may use the different receive beams for BRS-RP measurement and beam tracking. In some embodiments, a default period K may be set to he one. Thus, the BRS subframe may be reserved exclusively for transmit/receive beam acquisition and tracking.

In the above embodiment, the UE 504 may have a single antenna port as well as a single antenna panel. In some embodiments, the UE 504 may have a single antenna panel but more than one receiver antenna port. In this case, the UE 504 may use one or more of the antenna ports for EPDCCH and PDSCH decoding and the remainder for BRS-RP measurement in the subframe. The UE 504 may report to the eNB 502 a BRS CSI measured from the receiver antenna ports used for EPDCCH and PDSCH decoding in the BRS subframe. The BRS CSI may be reported in a different CSI process (a BRS CSI process) than the normal CSI process that contains the CSI measured for the EPDCCH and PDSCH from all receiver antenna ports. The BRS CSI report may include an indication that the CSI is a BRS CSI.

In other embodiments, rather than a single antenna panel, the UE 504 may contain multiple antenna panels used to communicate with the eNB 502. The use of each antenna panel may be independent of any other antenna panel. In some embodiments, a particular antenna panel may be used different purposes (e.g., BRS or EPDCCH/PDSCH reception) in each subframe or set of subframes. The UE 504 may, for example, reserve one (or more) antenna panel to receive the EPDCCH and PDSCH from the eNB 502 while the remaining antenna panels may be used to track and refine beams in the BRS subframe using the BRS. An antenna panel that receives the EPDCCH and PDSCH may be referred to as a reserved antenna panel, while the antenna panel used to track and refine beams using the BRS may be referred to as an active antenna panel. In some embodiments, different antenna panels of the UE 504 may be used to receive the EPDCCH and PDSCH in different subframes.

In some embodiments, a particular antenna panel of the multiple antenna panels of the UE 504 may receive the EPDCCH and PDSCH every n/m subframes, where n is the number of antenna panels and m is the number of antenna panels in the set of antenna panels receiving the EPDCCH and PDSCH in that particular subframe, thereby rotating reception of the EPDCCH and PDSCH among the antenna panels equally. For example, if m=1, the eNB 502 may thus configure the UE 504 such that multiple antenna panels have the same BRS tracking period K (K=number of antenna panels) and each antenna panel has a different panel specific measurement shift ($K_{offset}$=0, 1, . . . , K-1).

In some embodiments, the particular antenna panel of the multiple antenna panels of the UE 504 may receive the EPDCCH and PDSCH for p consecutive subframes. If a plurality of antenna panels receive the EPDCCH and PDSCH for p consecutive subframes, in some embodiments, the antenna panels may all receive the EPDCCH and PDSCH for the same p consecutive subframes or, in other embodiments, the p consecutive subframes may be staggered among the antenna panels such that at least one of the antenna panels receiving the EPDCCH and PDSCH changes with each subframe or set of subframes. The antenna panels that receive the EPDCCH and PDSCH in a particular subframe may be disposed in any location—e.g., adjacent to each other or separated by at least one antenna panel in various embodiments. The specific antenna panel configuration, including values n, m, p, for the UE 504 to use in EPDCCH and PDSCH decoding and beam tracking and refinement in BRS subframes may be provided from the eNB 502, for example, in dedicated RRC signaling. Thus, each antenna panel may have periodic opportunities to track and refine transmitter and receiver beams.

The omni-directional BRS signals may be measured using the active antenna panel and reported to the eNB 502 by the UE 504. In some embodiments, when the reserved antenna panel is a directional antenna panel, the simultaneous BRS-RP measurement for all antenna panels may be enabled periodically and the eNB 502 may not schedule an EPDCCH or PDSCH for the UE 504, As above, the period and subframe offset may be configured by dedicated RRC signaling. In other embodiments, the BRS-RP measurement obtained using the reserved antenna panel may be enabled periodically, and the active antenna panel may be used to decode EPDCCH and PDSCH in the BRS subframes when the reserved antenna panel is used for measurement.

As the EPDCCH and PDSCH may be decoded by different antenna panels with different receive beams in the UE 504, the CSI measured from different antenna panels may be reported by the UE 504, In some embodiments, the CSI measured from different antenna panels may be reported in different CSI processes. In configuring the CSI, a bit may be added by the eNB 502 in the RRC configuration to the UE 504 to indicate whether the CSI is to be from a reserved antenna panel or from an active antenna panel. For example, the CSI bit may take value 0 to indicate the CSI is configured for active antenna panels and value 1 to indicate the reserved antenna panel CSI configuration. In some embodiments, the UE 504 may be instructed to use one or more antenna panels for a CSI measurement of the BRS via Downlink Control Information (DCI). For example, value 0 may indicate the CSI measured from active antenna panels should be reported and value 1 may indicate the reserved antenna panel CSI should be reported by the UE 504.

Figure 6:
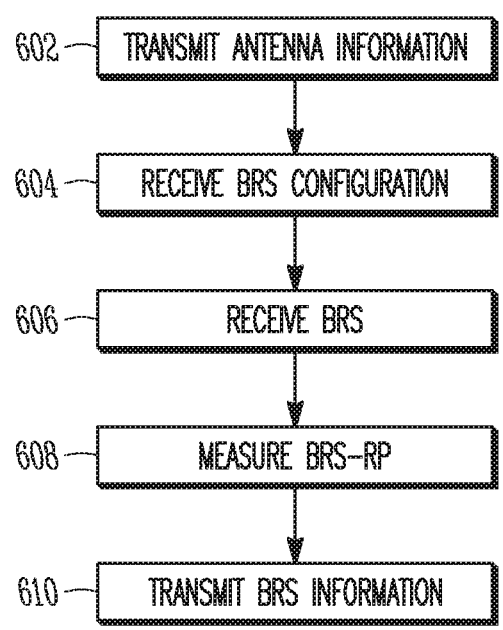
FIG. 6 illustrates a method of Beamformed Reference Signal (BRS) measurement in accordance with some embodiments.

FIG. 6 illustrates a method of BRS measurement in accordance with some embodiments. The method may be carried out by the UEs in any of FIGS. 1-5. At operation 602, the UE may provide the eNB with antenna information. The antenna information may be provided at admission control, when the UE initially attaches to the eNB, or later. Transmission of the antenna information may be initiated by the UE or may be requested by the eNB. The antenna information may include the number of antenna panels of the UE, as well as parameters for each antenna panel such as whether the UE antenna panel supports receiver beamforming, the number of digital chains per antenna panel, and the number of receiver and transmitter antenna ports.

The antenna information may also include whether the UE uses MIMO reception. This information may be used by the eNB to determine the manner to trigger reception of the BRS subframes by the UE. The UE may receive at operation 604 the BRS subframe configuration information in an RRC message from the eNB or in a system information broadcast, for example. This may include the periodicity and offset for the BRS subframes for each antenna panel.

After having transmitted the antenna information to the eNB and received the BRS configuration information, the UE may at operation 606 receive BRS subframes from the eNB. The BRS subframes may, if the UE is capable of MIMO reception, be received in predetermined sets of downlink subframes such as in every downlink subframe. The BRS in different beams and/or subframes may be in different resource blocks. Alternatively, the UE may receive or perform BRS subframes only periodically. The BRS subframes may be received every K subframes or frames, with a subframe offset $K_{offset}$. The period K and subframe offset $K_{offset}$ may be configured by dedicated RRC signaling from the eNB to the UE. In various embodiments, the beam that carries the BRS sequence may change each time the UE measures the BRS and may be allocated to the same resource blocks among the beams or may vary with the beam or subframe. The UE may receive PDSCH subframes, which may or may not contain data for the UE, between the BRS subframes.

Regardless of the manner in which the UE receives the BRS in one of the BRS subframes, at operation 608, the UE may measure the BRS-RP of the BRS. After measuring the BRS-RP of each beam at least once, an optimal receiver beam (with the highest BRS-RP) tray be selected by the UE for EPDCCH and PDSCH decoding. The BRS subframe may be reserved by the UE exclusively for transmit/receive beam acquisition and tracking. The UE may perform fine beam tracking using the BRS-RP. If the UE has multiple antenna ports or panels, the UE may use one or more of the antenna ports or panels for EPDCCH and PDSCH decoding and the remainder for BRS-RP measurement in a subframe.

At operation 610, the UE may transmit BRS information to the eNB. This information may include either or both the BRS-RP measurements and the optimal receiver beam. The UE may report the BRS CSI measured from the receiver antenna ports used for EPDCCH and PDSCH decoding in the BRS subframe. The BRS CSI may be reported in a different CSI process (BRS CSI process) than the normal CSI processing. If the CSI is measured from different antenna panels by the UE, the different CSIs may be indicated using unique indicators to indicate whether the CSI is from a reserved antenna panel or from an active antenna panel.

Example 1 is an apparatus of user equipment (UE) comprising processing circuitry arranged to: decode a MIMO beamformed Reference Signal (BRS) subframe in one of a plurality of simultaneous Multiple Input Multiple Output (MIMO) beams from an evolved Node-B (eNB), the BRS subframe comprising a BRS, wherein a structure of the BRS subframe and a structure of a BRS subframe of at least another of the simultaneous MIMO beams is dependent on antenna information of the UE; and measure BRS Received Power (BRS-RP) of the BRS; generate a BRS report based on the BRS-RP.

In Example 2, the subject matter of Example 1 optionally includes that the structure of the BRS subframe comprises inclusion of at least one of data and control signals for the UE.

In Example 3, the subject matter of any one or more of Examples 1-2 optionally include that the BRS in each simultaneous MIMO beam comprises a different BRS sequence that uniquely identifies an associated one of the simultaneous MIMO beams.

In Example 4, the subject matter of any one or more of Examples 1-3 optionally include that the BRS in at least one of the simultaneous MIMO beams is allocated to a different resource block from the BRS in at least one other of the simultaneous MIMO beams.

In Example 5, the subject matter of any one or more of Examples 1-4 optionally include that the BRS in different BRS subframes of one of the simultaneous MIMO beams are allocated to different resource blocks.

In Example 6, the subject matter of any one or more of Examples 1-5 optionally include a transceiver arranged to communicate with the eNB, the transceiver arranged to transmit, to the eNB prior to reception of the BRS subframe, the antenna information, the antenna information comprising at least one of a number of antenna panels of the UE, whether each UE antenna panel supports receiver beamforming, a number of digital chains per antenna panel, and a number of receiver and transmitter antenna ports for each antenna panel.

In Example 7, the subject matter of any one or more of Examples 1-6 optionally include a single antenna panel, wherein the BRS subframe is free from at least one of an enhanced physical downlink control channel (EPDCCH) and physical downlink shared channel (PDSCH) for the UE.

In Example 8, the subject matter of any one or more of Examples 1-7 optionally include a single antenna panel, wherein the processing circuitry is further arranged to: periodically measure the BRS-RP every K subframes with a subframe offset Koffset, where K is a non-zero integer value and Koffset has a value from 0 to K-1, and decode at least one of an enhanced physical downlink control channel (EPDCCH) and physical downlink shared channel (PDSCH) for subframes other than BRS subframes.

In Example 9, the subject matter of Example 8 optionally includes a transceiver arranged to communicate with the eNB, the transceiver arranged to receive K and Koffset in a Radio Resource Control (RRC) signal prior to reception of the BRS subframe.

In Example 10, the subject matter of any one or more of Examples 8-9 optionally include that the processing circuitry is further arranged to: measure the BRS-RP of a different simultaneous MIMO beam every K subframes.

In Example 11, the subject matter of any one or more of Examples 1-10 optionally include a single antenna panel comprising a plurality of antenna ports comprising a first set of the antenna ports configured to receive the BRS in the BRS subframe and a second set of the antenna ports configured to receive an enhanced physical downlink control channel (EPDCCH) and a physical downlink shared channel (PDSCH) in the BRS subframe.

In Example 12, the subject matter of any one or more of Examples 1-11 optionally include a plurality of antenna panels comprising at least one active antenna panel each configured to receive a BRS in a BRS subframe of a different simultaneous MIMO beam and at least one reserved antenna panel each configured to receive at least one of an enhanced physical downlink control channel (EPDCCH) and physical downlink shared channel (PDSCH) in each of the BRS subframes of the different simultaneous MIMO beams.

In Example 13, the subject matter of Example 12 optionally includes, wherein the processing circuitry is further arranged to: determine a Channel State Information (CSI) configuration for each of the at least one active antenna panel and the at least one reserved antenna panel from a Radio Resource Control (RRC) signal, the CSI configuration comprising an indication for which of the at least one active antenna panel and the at least one reserved antenna panel the CSI configuration is intended.

In Example 14, the subject matter of any one or more of Examples 12-13 optionally include that the processing circuitry is further arranged to: determine a Channel State Information (CSI) trigger for each of the at least one active antenna panel and the at least one reserved antenna panel from Downlink Control Information (DCI), the CSI trigger comprising an indication which of the at least one active antenna panel and the at least one reserved antenna panel the CSI trigger is to report a CSI measurement.

In Example 15, the subject matter of any one or more of Examples 12-14 optionally include that the processing circuitry is further arranged to: periodically measure, for each antenna panel, the BRS-RP every K subframes with a subframe offset Koffset, where K is a non-zero integer value and Koffset has a value from 0 to K-1, and each antenna panel has the same K and different Koffset.

Example 16 is an apparatus of an evolved NodeB (eNB) comprising processing circuitry arranged to: determine a MIMO beamformed Reference Signal (BRS) configuration based on antenna capacity of a user equipment (UE); generate a plurality of simultaneous Multiple Input Multiple Output (MIMO) beams, at least one of the simultaneous MIMO beams comprising a BRS subframe, the BRS subframe comprising a structure dependent on the UE antenna capacity; and process a report comprising BRS Received Power (BRS-RP) of the BRS based on the BRS configuration.

In Example 17, the subject matter of Example 16 optionally includes that the structure of the BRS subframe comprises whether at least one of an enhanced physical downlink control channel (EPDCCH) and physical downlink shared channel (PDSCH) for the UE is in the BRS subframe.

In Example 18, the subject matter of Example 17 optionally includes that a structure of a BRS subframe of at least another the simultaneous MIMO beams is dependent on the antenna capacity.

In Example 19, the subject matter of any one or more of Examples 17-18 optionally include at least one of: the BRS in each simultaneous MIMO beam comprises a different BRS sequence that uniquely identifies the MIMO beam, the BRS in at least one of the simultaneous MIMO beams is allocated to a different resource block from the BRS in at least one other of the simultaneous MIMO beams, and the BRS in different BRS subframes of one of the simultaneous MIMO beams are allocated to different resource blocks.

In Example 20, the subject matter of any one or more of Examples 17-19 optionally include that he processing circuitry is further arranged to: in response to the antenna capacity indicating that the UE comprises a single antenna panel, generate a BRS subframe on the at least one of the simultaneous MIMO beams every K subframes with a subframe offset Koffset, in which each BRS subframe is free from at least one of an enhanced physical downlink control channel (EPDCCH) and physical downlink shared channel to (PDSCH) for the UE.

In Example 21, the subject matter of any one or more of Examples 17-20 optionally include that the processing circuitry is further arranged to: in response to the antenna capacity indicating that the UE comprises a single antenna panel and a plurality of antenna ports, generate in different simultaneous MIMO beams a BRS subframe free from at least one of an enhanced physical downlink control channel (EPDCCH) and physical downlink shared channel (PDSCH) for the UE to a first set of the antenna ports configured to receive the BRS subframe and at least one of an EPDCCH and PDSCH for the UE to a second set of the antenna ports configured to receive the at least one of the EPDCCH and PDSCH in the BRS subframe.

In Example 22, the subject matter of any one or more of Examples 17-21 optionally include that the processing circuitry is further arranged to: in response to the antenna capacity indicating that the UE comprises a plurality of antenna panels, generate in different simultaneous MIMO beams a BRS subframe comprising the BRS and an enhanced physical downlink control channel (EPDCCH) and physical downlink shared channel (PDSCH) for the UE.

Example 23 is a computer-readable storage medium that stores instructions for execution by one or more processors of a user equipment (UE) to communicate with an evolved NodeB (eNB), the one or more processors to configure the UE to: transmit to the eNB antenna capacity of the UE; receive from the eNB a beamformed Reference Signal (BRS) configuration based on the antenna capacity; receive a BRS subframe comprising a BRS in one of a plurality of simultaneous Multiple Input Multiple Output (MIMO) beams from the eNB, a structure of the BRS subframe dependent on the antenna capacity; measure BRS Received Power (BRS-RP) of the BRS; transmit to the eNB a BRS report based on the BRS-RP; and select an optimal MIMO beam based on BRS-RPs from BRSs of the simultaneous MIMO beams.

In Example 24, the subject matter of Example 23 optionally includes, wherein: the structure of the BRS subframe comprises whether at least one of an enhanced physical downlink control channel (EPDCCH) and physical downlink shared channel (PDSCH) for the UE is in the BRS subframe.

In Example 25, the subject matter of any one or more of Examples 23-24 optionally include or 24, wherein the one or more processors further configure the UE to at least one of receive a BRS subframe that is free from at least one of an enhanced physical downlink control channel (EPDCCH) and physical downlink shared channel (PDSCH) for the UE in response to the antenna information indicating that the UE comprises a single antenna, receive at a first set of antenna ports the BRS in the BRS subframe and an EPDCCH and a PDSCH in the BRS subframe at a second set of the antenna ports, in response to the antenna information indicating that the UE comprises a single antenna comprising a plurality of antenna ports, and receive, at each of at least one active antenna panel, a BRS in a BRS subframe of a different MIMO beam and, at each of at least one reserved antenna panel, at least one of an EPDCCH and a PDSCH in each of the BRS subframes of the different simultaneous MIMO beams, in response to the antenna information indicating that the UE comprises a plurality of antenna panels.

In Example 26, the subject matter of any one or more of Examples 23-25 optionally include that the one or more processors further configure the UE to: perform a single beam searching to measure the BRS of all of the simultaneous MIMO beams a single time to select the optimal simultaneous MIMO beam taking M BRS subframes, where M is K×a number of simultaneous MIMO beams, and measure the BRS-RP in BRS subframes defined by: $0 \leq (n_{sf} \mod T_{BRS}) \mod K - K_{offset} < M$ where K is a non-zero integer value, subframe offset $K_{offset}$ is a value from 0 to K-1, $n_{sf}$ is a subframe number (SFN), $T_{BRS}$ is a BRS subframe period and M, K and $K_{offset}$ are configured by Radio Resource Control (RRC) signaling.

Example 27 is a user equipment (UE) comprising: means for transmitting to the eNB antenna capacity of the UE; means for receiving from the eNB a beamformed Reference Signal (BRS) configuration based on the antenna capacity; means for receiving a BRS subframe comprising a BRS in one of a plurality of simultaneous Multiple Input Multiple Output (MIMO) beams from the eNB, a structure of the BRS subframe dependent on the antenna capacity; means for measuring BRS Received Power (BRS-RP) of the BRS; means for transmitting to an evolved NodeB (eNB) a BRS report based on the BRS-RP; and means for selecting an optimal MIMO beam based on BRS-RPs from BRSs of the simultaneous MIMO beams.

In Example 28, the subject matter of claim 27 optionally includes that the structure of the BRS subframe comprises whether at least one of an enhanced physical downlink control channel (EPDCCH) and physical downlink shared channel (PDSCH) for the UE is in the BRS subframe.

In Example 29, the subject matter of claim 27 or 28 optionally includes that the UE further comprises: means for receiving a BRS subframe that is free from at least one of an enhanced physical downlink control channel (EPDCCH) and physical downlink shared channel (PDSCH) for the UE in response to the antenna information indicating that the UE comprises a single antenna, means for receiving at a first set of antenna ports the BRS in the BRS subframe and an EPDCCH and a PDSCH in the BRS subframe at a second set of the antenna ports, in response to the antenna information indicating that the UE comprises a single antenna comprising a plurality of antenna ports, and means for receiving, at each of at least one active antenna panel, a BRS in a BRS subframe of a different MIMO beam and, at each of at least one reserved antenna panel, at least one of an EPDCCH and a PDSCH in each of the BRS subframes of the different simultaneous MIMO beams, in response to the antenna information indicating that the UE comprises a plurality of antenna panels.

In Example 30, the subject matter of any one or more of Examples 27-29 optionally include that the UE further comprises: means for performing a single beam searching to measure the BRS of all of the simultaneous MIMO beams a single time to select the optimal simultaneous MIMO beam taking M BRS subframes, where M is K×a number of simultaneous MIMO beams, and means for measuring the BRS-RP in BRS subframes defined by:

$$0 \le (n_{sf} \bmod T_{BRS}) \bmod K - K_{offset} < M$$

where K is a non-zero integer value, subframe offset $K_{offset}$ is a value from 0 to K-1, $n_{sf}$ is a subframe number (SFN), $T_{BRS}$ is a BRS subframe period and M, K and $K_{offset}$ are configured by Radio Resource Control (RRC) signaling.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of user equipment (UE) comprising:
processing circuitry arranged to:
decode a MIMO beamformed Reference Signal (BRS) subframe in one of a plurality of Multiple Input Multiple Output (MIMO) beams from a base station, the BRS subframe comprising a BRS, wherein a structure of the BRS subframe and a structure of a BRS subframe of at least another of the MIMO beams is dependent on antenna information of the UE;
decode at least one of an enhanced physical downlink control channel (EPDCCH) and physical downlink shared channel (PDSCH) for subframes other than BRS subframes;
periodically measure BRS Received Power (BRS-RP) of the BRS every K subframes with a subframe offset $K_{offset}$, where K is a non-zero integer value and $K_{offset}$ has a value from 0 to K-1; and
generate a BRS report based on the BRS-RP; and
a memory arranged to store the BRS report for transmission to the base station.

2. The apparatus of claim 1, wherein:
the structure of the BRS subframe comprises inclusion of at least one of data and control signals for the UE.

3. The apparatus of claim 1, wherein:
the BRS in each MIMO beam comprises a different BRS sequence that uniquely identifies an associated one of the MIMO beams.

4. The apparatus of claim 1, wherein:
the BRS in at least one of the MIMO beams is allocated to a different resource block from the BRS in at least one other of the MIMO beams.

5. The apparatus of claim 1, wherein:
the BRS in different BRS subframes of one of the MIMO beams are allocated to different resource blocks.

6. The apparatus of claim 1, further comprising:
a transceiver arranged to communicate with the eNB, the transceiver arranged to transmit, to the eNB prior to reception of the BRS subframe, the antenna information,
wherein the antenna information comprises at least one of a number of antenna panels of the UE, whether each UE antenna panel supports receiver beamforming, a number of digital chains per antenna panel, and a number of receiver and transmitter antenna ports for each antenna panel.

7. The apparatus of claim 1, further comprising:
a single antenna panel,
wherein the BRS subframe is free from at least one of an EPDCCH) and PDSCH for the UE.

8. The apparatus of claim 1, further comprising:
a transceiver arranged to communicate with the base station, the transceiver arranged to receive K and $K_{offset}$ in a Radio Resource Control (RRC) signal prior to reception of the BRS subframe.

9. The apparatus of claim 1, wherein the processing circuitry is further arranged to:
measure the BRS-RP of a different MIMO beam every K subframes.

10. The apparatus of claim 1, further comprising:
a single antenna panel comprising a plurality of antenna ports comprising a first set of the antenna ports configured to receive the BRS in the BRS subframe and a second set of the antenna ports configured to receive an EPDCCH) and PDSCH in the BRS subframe.

11. The apparatus of claim 1, further comprising:
a plurality of antenna panels comprising at least one active antenna panel each configured to receive a BRS in a BRS subframe of a different MIMO beam and at least one reserved antenna panel each configured to receive at least one of an EPDCCH) and PDSCH in each of the BRS subframes of the different MIMO beams.

12. The apparatus of claim 11, wherein the processing circuitry is further arranged to:
determine a Channel State Information (CSI) configuration for each of the at least one active antenna panel and the at least one reserved antenna panel from a Radio Resource Control (RRC) signal, the CSI configuration comprising an indication for which of the at least one active antenna panel and the at least one reserved antenna panel the CSI configuration is intended.

13. The apparatus of claim 11, wherein the processing circuitry is further arranged to:
determine a Channel State Information (CSI) trigger for each of the at least one active antenna panel and the at least one reserved antenna panel from Downlink Control Information (DCI), the CSI trigger comprising an indication which of the at least one active antenna panel and the at least one reserved antenna panel the CSI trigger is to report a CSI measurement.

14. The apparatus of claim 11, wherein the processing circuitry is further arranged to:
periodically measure, for each antenna panel, the BRS-RP every K subframes with a subframe offset $K_{offset}$, where each antenna panel has the same K and different $K_{offset}$.

15. A non-transitory computer-readable storage medium that stores instructions for execution by one or more processors of a user equipment (UE), the one or more processors to configure the UE to:
decode a MIMO beamformed Reference Signal (BRS) subframe in one of a plurality of Multiple Input Multiple Output (MIMO) beams from a base station, the BRS subframe comprising a BRS, wherein a structure of the BRS subframe and a structure of a BRS subframe of at least another of the MIMO beams is dependent on antenna information of the UE;
decode at least one of an enhanced physical downlink control channel (EPDCCH) and physical downlink shared channel (PDSCH) for subframes other than BRS subframes;
periodically measure BRS Received Power (BRS-RP) of the BRS every K subframes with a subframe offset $K_{offset}$, where K is a non-zero integer value and $K_{offset}$ has a value from 0 to K-1; and
generate a BRS report based on the BRS-RP.

16. The medium of claim 15, wherein:
the BRS in each MIMO beam comprises a different BRS sequence that uniquely identifies an associated one of the MIMO beams.

17. The medium of claim 15, wherein at least one of:
the BRS in at least one of the MIMO beams is allocated to a different resource block from the BRS in at least one other of the MIMO beams, or
the BRS in different BRS subframes of one of the MIMO beams are allocated to different resource blocks.

18. The medium of claim 15, wherein:
the one or more processors further configure the UE to transmit, to the base station prior to reception of the BRS subframe, the antenna information, and
the antenna information comprises at least one of a number of antenna panels of the UE, whether each UE antenna panel supports receiver beamforming, a number of digital chains per antenna panel, and a number of receiver and transmitter antenna ports for each antenna panel.

19. The medium of claim 15, wherein:
the UE comprises a single antenna panel, and
the BRS subframe is free from at least one of an EPDCCH) and PDSCH for the UE.

20. The medium of claim 15, wherein the one or more processors further configure the UE to:
receive K and $K_{offset}$ in a Radio Resource Control (RRC) signal prior to reception of the BRS subframe.

21. The medium of claim 15, wherein the one or more processors further configure the UE to:
measure the BRS-RP of a different MIMO beam every K subframes.

22. The medium of claim 15, wherein:
the UE comprises a single antenna panel comprising a plurality of antenna ports, and
the plurality of antenna ports comprise a first set of the antenna ports configured to receive the BRS in the BRS subframe and a second set of the antenna ports configured to receive an EPDCCH) and PDSCH in the BRS subframe.

23. The medium of claim 15, wherein:
the UE comprises a plurality of antenna panels, and
the plurality of antenna panels comprises at least one active antenna panel each configured to receive a BRS in a BRS subframe of a different MIMO beam and at least one reserved antenna panel each configured to receive at least one of an EPDCCH) and PDSCH in each of the BRS subframes of the different MIMO beams.

24. The medium of claim 23, wherein the one or more processors further configure the UE to at least one of:
determine a Channel State Information (CSI) configuration for each of the at least one active antenna panel and the at least one reserved antenna panel from a Radio Resource Control (RRC) signal, the CSI configuration comprising an indication for which of the at least one active antenna panel and the at least one reserved antenna panel the CSI configuration is intended,
determine a Channel State Information (CSI) trigger for each of the at least one active antenna panel and the at least one reserved antenna panel from Downlink Control Information (DCI), the CSI trigger comprising an indication which of the at least one active antenna panel and the at least one reserved antenna panel the CSI trigger is to report a CSI measurement, or periodically measure, for each antenna panel, the BRS-RP every K subframes with a subframe offset $K_{offset}$, where each antenna panel has the same K and different $K_{offset}$.

* * * * *